(12) United States Patent
Kunihiro

(10) Patent No.: US 10,406,644 B2
(45) Date of Patent: Sep. 10, 2019

(54) MACHINING SYSTEM

(71) Applicant: Fanuc Corporation, Yamanashi (JP)

(72) Inventor: Keisuke Kunihiro, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/494,135

(22) Filed: Apr. 21, 2017

(65) Prior Publication Data

US 2017/0312875 A1 Nov. 2, 2017

(30) Foreign Application Priority Data

Apr. 28, 2016 (JP) ................. 2016-091927

(51) Int. Cl.
| | |
|---|---|
| *B23Q 17/22* | (2006.01) |
| *B23Q 7/04* | (2006.01) |
| *B25J 13/08* | (2006.01) |
| *B25J 11/00* | (2006.01) |
| *B25J 15/00* | (2006.01) |
| *B23Q 17/00* | (2006.01) |

(52) U.S. Cl.
CPC ............ *B23Q 17/22* (2013.01); *B23Q 7/043* (2013.01); *B25J 11/005* (2013.01); *B25J 13/085* (2013.01); *B25J 15/0066* (2013.01); *B23Q 2017/001* (2013.01); *Y02P 90/087* (2015.11)

(58) Field of Classification Search
CPC .. B23Q 2017/001; B23Q 17/22; B25J 11/007; B25J 11/0055; B25J 13/085; B25J 19/028; Y10S 901/46; Y10S 901/44; Y10T 409/306048; Y10T 409/30728; Y10T 409/306888
See application file for complete search history.

(56) References Cited

U.S. PATENT DOCUMENTS 3,650,036 A * 3/1972 Coveney .................. G01B 7/28
33/554
4,640,663 A * 2/1987 Niinomi ................. B25J 13/085
414/730

(Continued)

FOREIGN PATENT DOCUMENTS

| CN | 104647138 A | 5/2015 |
|---|---|---|
| CN | 105458878 A | 4/2016 |

(Continued)

OTHER PUBLICATIONS

Japan Patent Office, Office Action dated Apr. 24, 2018 for Japan Patent Application No. 2016-091927.

(Continued)

*Primary Examiner* — Ryan C Rufo

(74) *Attorney, Agent, or Firm* — Winstead PC

(57) ABSTRACT

A machining system includes a robot arm for changing a workpiece or inspecting a machined workpiece, and a probe that is attached to a distal end portion of the robot arm via a force sensor, where the robot arm is controlled such that the probe is arranged at a predetermined measurement position in contact with a side surface of a tool holder, where detection values of the force sensor are obtained over a predetermined period of time in a state where a main spindle is performing rotation operation, where an attached state of the tool holder is determined based on the detection values obtained over the predetermined period of time.

2 Claims, 9 Drawing Sheets

(56) References Cited

U.S. PATENT DOCUMENTS

| | | | | |
|---|---|---|---|---|
| 6,060,855 | A * | 5/2000 | Matsuhashi | G05B 19/401 318/560 |
| 6,568,096 | B1 * | 5/2003 | Svitkin | B23Q 1/76 33/501.02 |
| 6,754,973 | B2 * | 6/2004 | Takahashi | G01B 5/08 33/551 |
| 6,810,593 | B2 * | 11/2004 | Kobayashi | F16F 15/324 33/203 |
| 6,941,192 | B2 * | 9/2005 | Tang | B23Q 17/22 318/568.1 |
| 6,952,884 | B2 * | 10/2005 | Danielli | B24B 5/42 33/501.02 |
| 7,047,658 | B2 * | 5/2006 | Danielli | B24B 5/42 33/555.1 |
| 2004/0080294 | A1 * | 4/2004 | Nihei | B25J 19/02 318/568.16 |
| 2005/0238447 | A1 * | 10/2005 | Murota | B23Q 17/003 409/194 |
| 2006/0037443 | A1 | 2/2006 | D'Antonio | |
| 2012/0265345 | A1 | 10/2012 | Nakahara | |
| 2016/0089789 | A1 | 3/2016 | Sato | |
| 2016/0167184 | A1 * | 6/2016 | Burkhardt | B23Q 1/66 409/172 |
| 2016/0184951 | A1 * | 6/2016 | Kurokawa | B25J 11/00 408/8 |
| 2017/0057039 | A1 * | 3/2017 | Nakayama | B23Q 17/0904 |

FOREIGN PATENT DOCUMENTS

| | | | | |
|---|---|---|---|---|
| EP | 1426146 | A1 | 6/2004 | |
| EP | 2500150 | A2 * | 9/2012 | ............ B25J 9/1687 |
| EP | 2511054 | A2 | 10/2012 | |
| EP | 3086192 | A1 * | 10/2016 | ............ G05B 19/402 |
| JP | S49-125972 | A | 12/1974 | |
| JP | S62-166952 | A | 7/1987 | |
| JP | H02-243252 | A | 9/1990 | |
| JP | H03-239453 | A | 10/1991 | |
| JP | H04-005365 | U | 1/1992 | |
| JP | H07-112350 | A | 5/1995 | |
| JP | H08-290350 | A | 11/1996 | |
| JP | H09-29577 | A | 2/1997 | |
| JP | 2000079537 | A | 3/2000 | |
| JP | 2002-331442 | A | 11/2002 | |
| JP | 2004-142015 | A | 5/2004 | |
| JP | 2005-313254 | A | 11/2005 | |
| JP | 2008-076309 | A | 4/2008 | |
| JP | 2012-223840 | A | 11/2012 | |
| JP | 2017-049656 | A | 3/2017 | |

OTHER PUBLICATIONS

Japan Patent Office, Search Report dated Mar. 30, 2018 for Japan Patent Application No. 2016-091927.
State Intellectual Property Office of People's Republic of China, Office Action dated Dec. 25, 2018 for Application No. 201710233474.4.

* cited by examiner

MACHINING SYSTEM

CROSS-REFERENCE TO RELATED APPLICATIONS

This application is based on Japanese Patent Application No. 2016-091927 filed on Apr. 28, 2016, the content of which is incorporated herein by reference.

TECHNICAL FIELD

The present invention relates to a machining system, and more particularly, to a machining system including a machine tool, and a robot for changing a workpiece at the machine tool or for inspecting a machined workpiece.

BACKGROUND ART

As a machining system, a system which has, attached to a contact surface to a tool holder at a lower end portion of a main spindle of a machine tool, a plurality of strain gauges and an output circuit for outputting detection results of the plurality of strain gauges outside, and which detects presence/absence of chips or foreign substances between the contact surface and the tool holder based on output values of the output circuit is known (for example, see PTL 1).

CITATION LIST

Patent Literature

{PTL 1}
Japanese Unexamined Patent Application, Publication No. 2000-79537

SUMMARY OF INVENTION

A machining system according to a first aspect of the present invention includes a machine tool for machining a workpiece by rotating a tool attached to a main spindle; a robot including at least one robot arm, for conducting a change of the workpiece for the machine tool or an inspection of the workpiece after machining; a contact section that is attached to a distal end portion of the robot arm via a force sensor; and a control unit, wherein the control unit is configured to conduct: a measurement process of controlling the robot arm such that the contact section is positioned at a predetermined measurement position where the contact section comes into contact with a side surface of the tool or a side surface of a tool holder for attaching the tool to the main spindle, and obtaining detection values of the force sensor over a predetermined period of time in a state where the main spindle is rotating; and a determination process of determining an attached state of the tool or the tool holder based on the detection values obtained over the predetermined period of time.

According to the first aspect, when the side surface of the tool or the side surface of the tool holder is displaced in a direction orthogonal to a center axis of the main spindle while the main spindle is rotating, the force acting on the force sensor is changed according to the displacement. Accordingly, if the position of the side surface of the tool or the side surface of the tool holder is deflected in a direction orthogonal to the center axis of the main spindle, the runout is reflected in the detection values that are obtained over the predetermined period of time. That is, the attached state of the tool or the tool holder can be determined based on the detection values.

A machining system according to a second aspect of the present invention includes a machine tool for machining a workpiece by rotating a tool attached to a main spindle; a robot including at least one robot arm, for conducting a change of the workpiece for the machine tool or an inspection of the workpiece after machining; a displacement sensor that is attached to a distal end portion of the robot arm; and a control unit, wherein the control unit is configured to conduct: a measurement process of controlling the robot arm such that the displacement sensor is positioned at a predetermined measurement position where the displacement sensor can detect displacement of a side surface of the tool or a side surface of a tool holder for attaching the tool to the main spindle, in a direction orthogonal to a center axis of the main spindle, and obtaining detection values of the displacement sensor over a predetermined period of time in a state where the main spindle is rotating; and a determination process of determining an attached state of the tool or the tool holder based on the detection values obtained over the predetermined period of time.

According to the second aspect, when the side surface of the tool or the side surface of the tool holder is displaced in a direction orthogonal to the center axis of the main spindle while the main spindle is rotating, detection values of the displacement sensor change according to the displacement. Accordingly, if the position of the side surface of the tool or the side surface of the tool holder is deflected in a direction orthogonal to the center axis of the main spindle, the runout is reflected in the detection values that are obtained over the predetermined period of time. That is, the attached state of the tool or the tool holder can be determined based on the detection values.

A machining system according to a third aspect of the present invention includes a machine tool for machining a workpiece by rotating a tool attached to a main spindle; a robot including at least one robot arm, for conducting a changed of the workpiece for the machine tool or an inspection of the workpiece after machining; a contact section that is attached to a distal end portion of the robot arm via a force sensor; and a control unit, wherein the control unit is configured to conduct: a measurement process of controlling the robot arm such that the contact section is positioned at predetermined measurement positions where the contact section comes into contact with a first circumferential position, a second circumferential position, and a third circumferential position of a side surface of the tool or a side surface of a tool holder for attaching the tool to the main spindle in a state where the main spindle is not rotated, and obtaining detection values of the force sensor at the situations where the contact section comes into contact with the first, the second, and the third circumferential positions, respectively; and a determination process of determining an attached state of the tool or the tool holder based on the detection values.

According to the third aspect, because the forces with which the contact section comes into contact with the first, the second, and the third circumferential positions are detected by the force sensor in states where the contact section attached to the distal end portion of the robot arm is positioned at the predetermined measurement positions, if the side surface of the tool or the side surface of the tool holder is shifted in a direction orthogonal to a center axis of the main spindle, the detection values of the force sensor change according to the shift. Accordingly, if the position of a center axis of the tool or the tool holder is shifted in the direction orthogonal to the center axis of the main spindle, the shift is reflected in the detection values. That is, the attached state of the tool or the tool holder can be determined based on the detection values.

A machining system according to a fourth aspect of the present invention includes a machine tool for machining a workpiece by rotating a tool attached to a main spindle; a robot including at least one robot arm for conducting a change of the workpiece for the machine tool or for an inspection of the workpiece after machining; a displacement sensor that is attached to a distal end portion of the robot arm; and a control unit, wherein the control unit is configured to conduct: a measurement process of controlling the robot arm such that the displacement sensor is positioned at predetermined measurement positions where the displacement sensor can detect displacement or positions of a first circumferential position, a second circumferential position, and a third circumferential position of a side surface of the tool or a side surface of a tool holder for attaching the tool to the main spindle in a state where the main spindle is not rotated, and obtaining detection values detected by the displacement sensor with respect to the first, the second, and the third circumferential positions, and a determination process of determining an attached state of the tool or the tool holder based on the detection values, wherein the displacement sensor detects the displacement or the positions of the first, the second, and the third circumferential positions, respectively, in a direction orthogonal to a center axis of the main spindle.

According to the fourth aspect, because the displacement sensor attached to the distal end portion of the robot arm detects displacement or positions for the first, the second, and the third circumferential positions, if the side surface of the tool or the side surface of the tool holder is shifted in a direction orthogonal to a center axis of the main spindle, the detection values of the displacement sensor change according to the shift. Accordingly, if the position of a center axis of the tool or the tool holder is shifted in the direction orthogonal to the center axis of the main spindle, the shift is reflected in the detection values. That is, the attached state of the tool or the tool holder can be determined based on the detection values.

Moreover, preferably, in each of the aspects described above, a measurement position information storage unit storing information about each predetermined measurement position in association with each of a plurality of types of tools is further included, where the control unit refers to the information, and controls the robot arm such that the contact section or the displacement sensor is positioned at each predetermined measurement position according to the type of the tool.

According to this aspect, the contact section or the displacement sensor is arranged at an appropriate position according to the type of the tool, and thus, there is an advantage when performing determination of an attached state after the tool is changed.

Advantageous Effects of Invention

According to the present invention, an attached state of a tool or a tool holder can be determined without adding equipment to a main spindle.

DESCRIPTION OF EMBODIMENTS

A machining system according to a first embodiment of the present invention will be described below with reference to the drawings.

Figure 1:
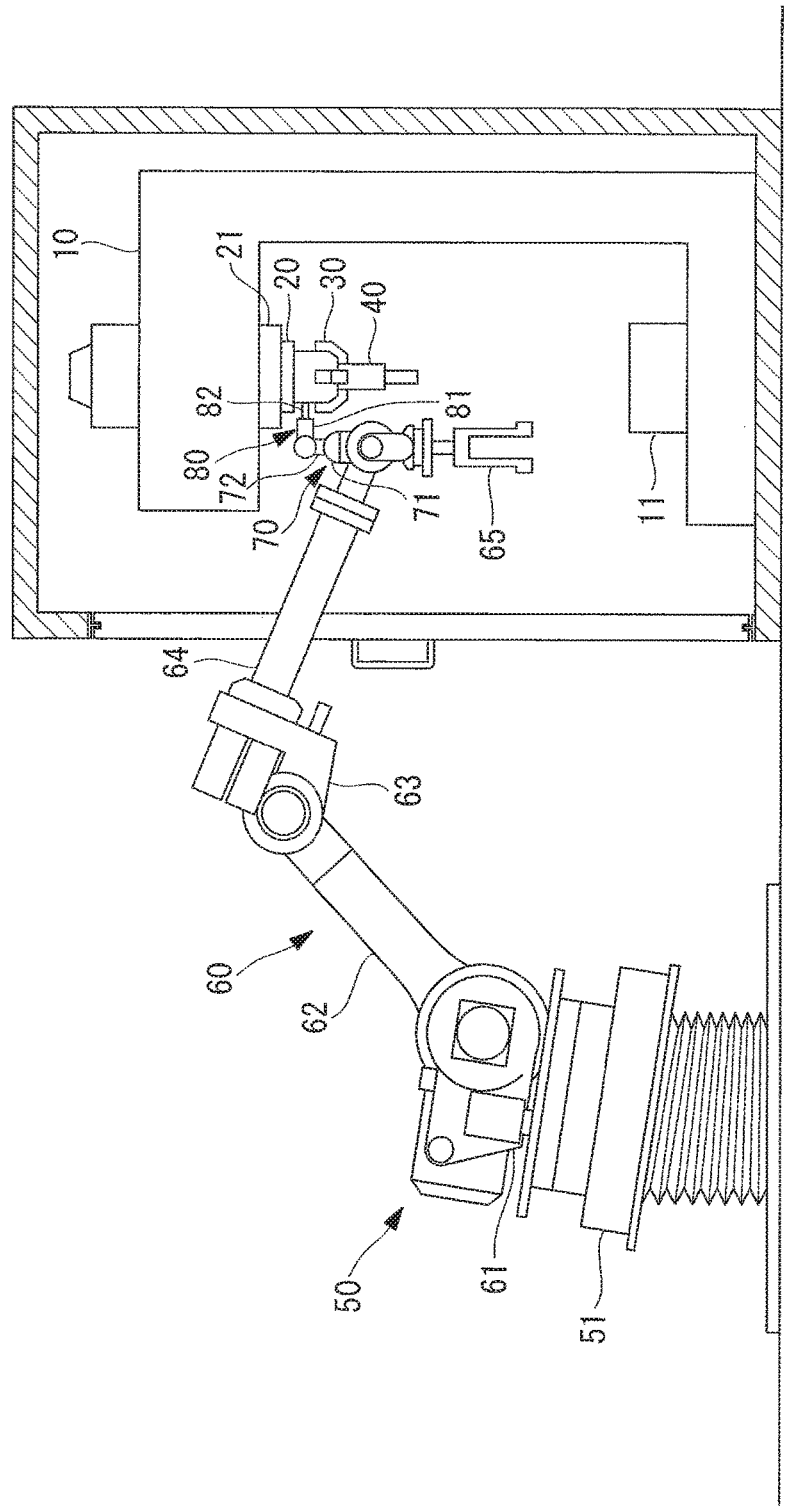
FIG. 1 is a schematic configuration diagram of a machining system according to a first embodiment of the present invention.

As shown in FIG. 1, this machining system includes a machine tool which machines a workpiece by a tool attached to a main spindle 20 that is supported by a frame 10 and workpiece is machined by rotating the main spindle 20. The main spindle 20 is supported by the frame 10 via a main spindle support section 21, and the main spindle 20 is moved in a vertical direction and is rotated by a known structure of the machine tool. For example, the main spindle 20 is rotated by a rotation servo motor 22 shown in FIG. 2, and the main spindle 20 is moved in the vertical direction by a vertical movement servo motor 23.

Furthermore, a workpiece holding section 11 where a workpiece is placed and held and the main spindle 20 may be configured to move relative to each other in a horizontal direction by a known structure of the machine tool. For example, the workpiece holding section 11 may be configured to move in a horizontal X-axis direction by a servo motor and a linear screw, and to move in a horizontal Y-axis direction by another servo motor and another linear screw.

The machine tool has a tool 40, such as an endmill, a milling cutter such as a face mill, a drill or the like, attached to the main spindle 20 via a tool holder 30.

The machining system also includes a robot 50 having a robot arm 60 for moving a workpiece before machining from a location where the workpiece before machining is placed to the workpiece holding section 11, and for moving a machined workpiece from the workpiece holding section 11 to a location where a machined workpiece is to be placed.

The robot 50 includes a base 51 that tilts with respect to the horizontal direction (the left-right direction and the depth direction in FIG. 1).

The robot arm 60 includes a base section 61 that is supported by the base 51 in a manner capable of rotating around an axis extending in a vertical direction, a proximal arm 62 that is supported by the base section 61 in a manner capable of rotating around an axis along a substantially horizontal direction, a middle section 63 that is supported at a distal end of the proximal arm 62 in a manner capable of rotating around an axis along a substantially horizontal direction, a distal arm 64 that is supported by the middle section 63, and a chuck section 65 that is supported at a distal end portion of the distal arm 64 in a manner capable of rotating around an axis along a substantially horizontal direction. The distal end of the distal arm 64 is configured to rotate around its center axis.

Also, a sensor support section 70 is attached to the distal end portion of the distal arm 64 of the robot arm 60. The sensor support section 70 includes a base section 71 that is supported at the distal end portion of the distal arm 64 in a manner capable of rotating around an axis extending in a vertical direction, and an arm 72 that is supported by the base section 71 in a manner capable of rotating around an axis along a substantially horizontal direction, and a force sensor unit 80 is supported at a distal end portion of the arm 72 in a manner capable of rotating around an axis along a substantially horizontal direction.

The force sensor unit 80 includes a force sensor 81 having a known structure of a strain gauge type, a piezoelectric type or the like, and a probe 82 as a contact section attached to a distal end of the force sensor 81, and the force sensor 81 detects a force acting on the probe 82 in the axial direction of the probe 82.

The robot 50 and the robot arm 60 include a servo motor 51a for tilting the base 51, a servo motor 61a for rotating the base section 61, a servo motor 62a for rotating the proximal arm 62, a servo motor 63a for rotating the middle section 63, a servo motor 64a for rotating the distal end of the distal arm 64, a servo motor 65a for rotating the chuck section 65, and a servo motor 65b for operating the chuck section 65.

The sensor support section 70 includes a servo motor 71a for rotating the base section 71, and a servo motor 72a for rotating the arm 72.

Figure 2:
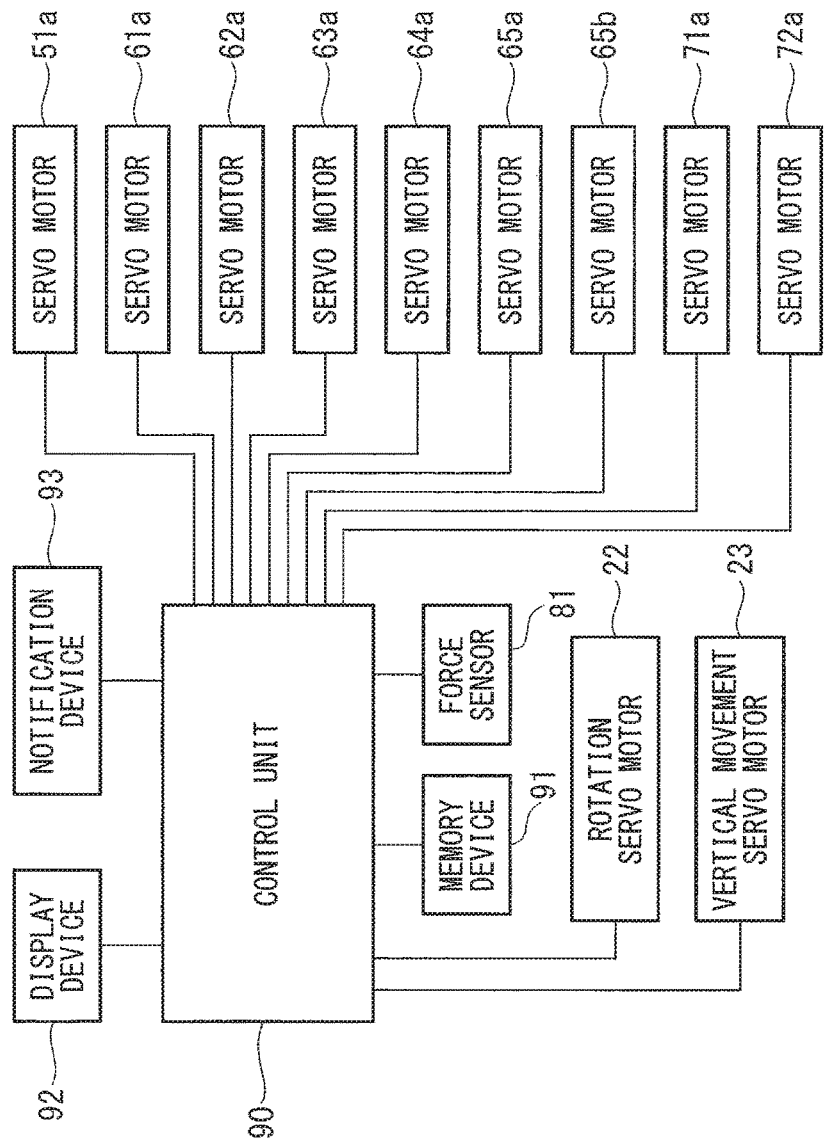
FIG. 2 is a schematic block diagram of the machining system according to the first embodiment.

As shown in FIG. 2, each servo motor 51a, 61a, 62a, 63a, 64a, 65a, 65b of the robot 50, each servo motor 71a, 72a of the sensor support section 70, and the rotation servo motor 22 and the vertical movement servo motor 23 of the main spindle 20 are connected to a control unit 90, and are controlled by the control unit 90. The control unit 90 is also connected to the force sensor 81, and receives detection values of the force sensor 81.

The control unit 90 operates according to a workpiece change program stored in a memory device 91 and controls each servo motor 51a, 61a, 62a, 63a, 64a, 65a, 65b to move, by the robot arm 60, a workpiece before machining from a location where the workpiece before machining is placed to the workpiece holding section 11 and a machined workpiece from the workpiece holding section 11 to a location where a machined workpiece is to be placed.

Figure 3:
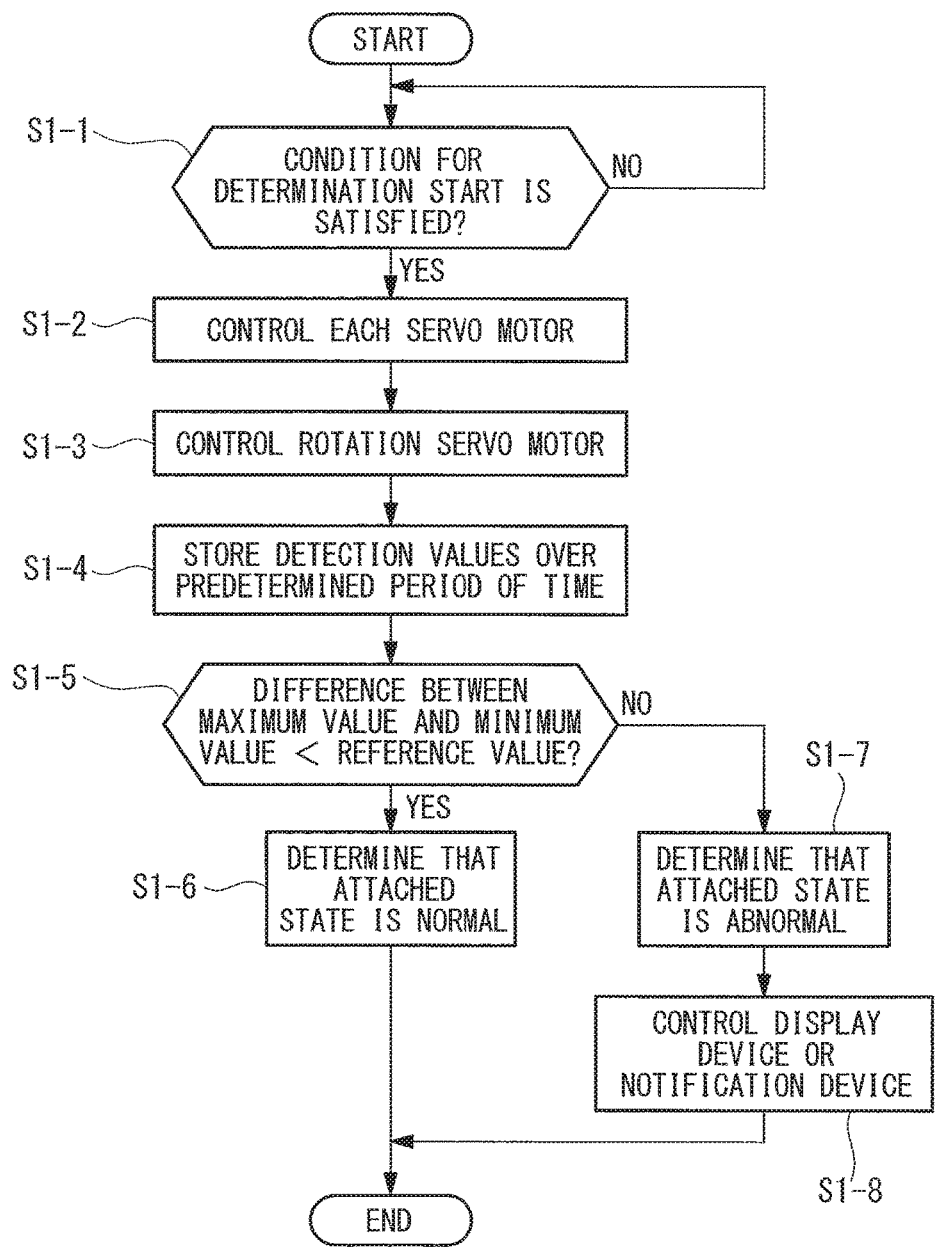
FIG. 3 is a flowchart showing example operation of a control unit according to the first embodiment.

Furthermore, the control unit 90 operates according to an attached state determination program stored in the memory device 91, and determines the attached states of the tool 40 and the tool holder 30 attached to the main spindle 20. Example operation of the control unit 90 at the time of determination of the attached state of the tool holder 30 will be described with reference to the flowchart shown in FIG. 3.

For example, when a predetermined timing comes and a condition for determination start is satisfied, or when a condition for determination start is satisfied by reception of a command for attached state determination start input by a predetermined input section by a worker (step S1-1), the control unit 90 controls each servo motor 51a, 61a, 62a, 63a, 64a, 65a, 65b, 71a, 72a such that the probe 82 is arranged at a predetermined measurement position in contact with a side surface of the tool holder 30, as shown in FIG. 1, in a state where the rotation servo motor 22 and the vertical movement servo motor 23 of the main spindle 20 are stopped (step S1-2). At this time, the servo motors 71a, 72a are preferably controlled such that the center axis of the probe 82 and the normal line of the side surface of the tool holder 30 substantially coincide with each other.

Next, the control unit 90 rotates the main spindle 20 by controlling the rotation servo motor 22 (step S1-3), and causes the memory device 91 to store detection values of the force sensor 81 over a predetermined period of time in a state where the main spindle 20 is rotated (step S1-4).

The detection values to be stored may be a series of detection values that are continuously detected during a predetermined period of time (a series of detection values changing according to rotation of the main spindle 20), or may be detection values at a plurality of points obtained, at predetermined intervals, from a series of detection values detected during the predetermined period of time. Also, in the case where the control unit 90 is configured to receive data regarding rotation positions of the main spindle 20, the series of detection values or the detection values at the plurality of points may be stored in the memory device 91 in association with their rotation positions of the main spindle 20.

Next, the control unit 90 determines the attached state of the tool holder 30 based on the detection values obtained over the predetermined period of time and stored in the memory device 91. Specifically, for example, in the case where the difference between the maximum value and the minimum value of the detection values obtained over the predetermined period of time is smaller than a predetermined reference value (step S1-5), the attached state is determined to be normal (step S1-6), and in the case where the difference between the maximum value and the minimum value of the detection values obtained over the predetermined period of time is equal to or greater than the predetermined reference value (step S1-5), the attached state is determined to be abnormal (step S1-7), and a display device 92 or a notification device 93 is controlled to indicate that the attached state is abnormal (step S1-8).

In this manner, in the first embodiment, when the side surface of the tool holder 30 is displaced in a direction orthogonal to the center axis of the main spindle 20 during rotation of the main spindle 20, the force acting on the force sensor 81 is changed according to the displacement. Accordingly, if the position of the side surface of the tool holder 30 is deflected in a direction orthogonal to the center axis of the main spindle 20, the runout is reflected in the detection values obtained over the predetermined period of time. That is, the attached state of the tool holder 30 may be determined based on the detection values.

Moreover, the attached state of the tool 40 may be determined in the same manner if the probe 82 is made to contact the side surface of the tool 40 in step S1-2.

A machining system according to a second embodiment of the present invention will be described below with reference to the drawings.

In contrast to the machining system of the first embodiment, the machining system of the present embodiment includes a non-contact or contact displacement sensor 83 at the distal end portion of the arm 72 of the sensor support section 70, instead of the force sensor 81 and the probe 82. Structures not described below are the same as those in the first embodiment.

As the displacement sensor 83, a known non-contact displacement meter, such as a laser displacement meter or an ultrasonic displacement meter, or a contact displacement meter that causes a probe to come into contact with a measurement target object and that measures displacement or the position of the measurement target object based on the amount of movement of the probe may be used, for example.

Figure 4:
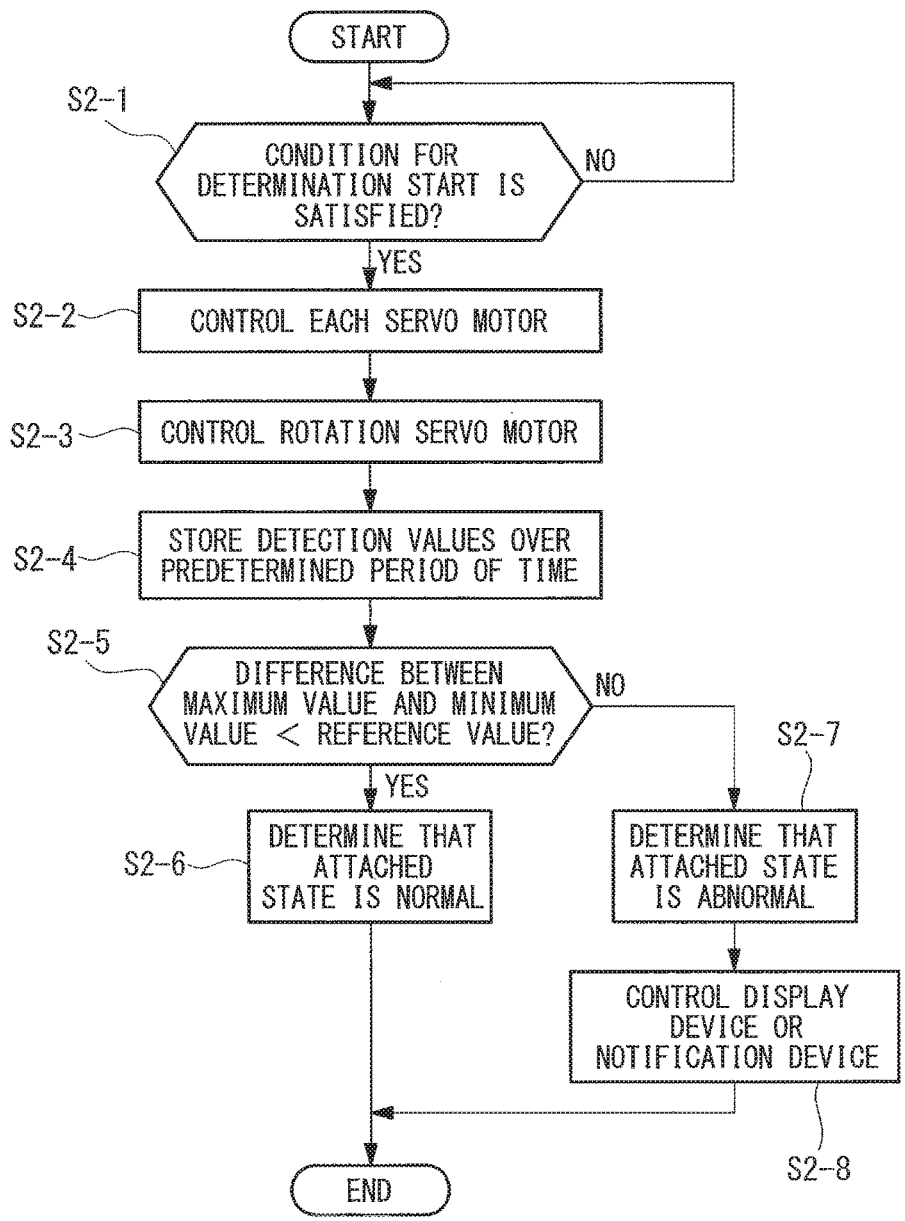
FIG. 4 is a flowchart showing example operation of a control unit of a machining system according to a second embodiment of the present invention.

Operation of the control unit 90 at the time of determination of the attached state of the tool holder 30 according to the present embodiment will be described with reference to the flowchart in FIG. 4.

Figure 5:
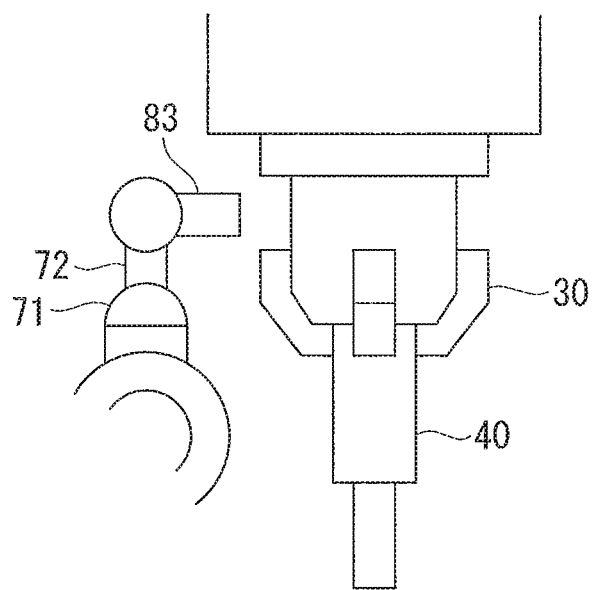
FIG. 5 is an explanatory diagram of operation of the machining system according to the second embodiment.

In the case where the displacement sensor 83 is of a non-contact type, when a condition for determination start is satisfied (step S2-1) as in the first embodiment, the control unit 90 controls each servo motor 51*a*, 61*a*, 62*a*, 63*a*, 64*a*, 65*a*, 65*b*, 71*a*, 72*a* such that the displacement sensor 83 is arranged at a predetermined measurement position near the side surface of the tool holder 30, as shown in FIG. 5, in a state where the rotation servo motor 22 and the vertical movement servo motor 23 of the main spindle 20 are stopped (step S2-2).

In step S2-2, if the displacement sensor 83 is of a contact type, each servo motor 51*a*, 61*a*, 62*a*, 63*a*, 64*a*, 65*a*, 65*b*, 71*a*, 72*a* is controlled such that a probe of the displacement sensor 83 is arranged at a predetermined measurement position in contact with the side surface of the tool holder 30. At this time, the servo motors 71*a*, 72*a* are preferably controlled such that the center axis of the probe and the normal line of the side surface of the tool holder 30 substantially coincide with each other.

Next, the control unit 90 rotates the main spindle 20 by controlling the rotation servo motor 22 (step S2-3), and causes the memory device 91 to store detection values of the displacement sensor 83 over a predetermined period of time in a state where the main spindle 20 is rotated (step S2-4).

The detection values to be stored may be a series of detection values that are continuously detected during the predetermined period of time (a series of detection values changing according to rotation of the main spindle 20), or may be detection values at a plurality of points obtained, at predetermined intervals, from a series of detection values detected during the predetermined period of time. Also, in the case where the control unit 90 is configured to receive data regarding a rotation position of the main spindle 20, the series of detection values or the detection values at a plurality of points may be stored in the memory device 91 in association with rotation positions of the main spindle 20.

Next, the control unit 90 determines the attached state of the tool holder 30 based on the detection values obtained over the predetermined period of time and stored in the memory device 91. Specifically, for example, in the case where the difference between the maximum value and the minimum value of the detection values obtained over the predetermined period of time is smaller than a predetermined reference value (step S2-5), the attached state is determined to be normal (step S2-6), and in the case where the difference between the maximum value and the minimum value of the detection values obtained over the predetermined period of time is equal to or greater than the predetermined reference value (step S2-5), the attached state is determined to be abnormal (step S2-7), and the display device 92 or the notification device 93 is controlled to indicate that the attached state is abnormal (step S2-8).

In this manner, in the second embodiment, when the side surface of the tool holder 30 is displaced in a direction orthogonal to the center axis of the main spindle 20 during rotation of the main spindle 20, the detection value of the displacement sensor 83 is changed according to the displacement. Accordingly, if the position of the side surface of the tool holder 30 is deflected in a direction orthogonal to the center axis of the main spindle 20, the runout is reflected in the detection values obtained over the predetermined period of time. That is, the attached state of the tool holder 30 may be determined based on the detection values.

Moreover, the attached state of the tool 40 may be determined in the same manner if the displacement sensor 83 is made to come close to the side surface of the tool 40 in step S2-2.

A machining system according to a third embodiment of the present invention will be described below with reference to the drawings.

In contrast to the machining system of the first embodiment, the machining system according to the present embodiment performs detection by the force sensor unit 80 in a state where the main spindle 20 is not rotated. Structures not described below are the same as those in the first embodiment.

Figure 6:
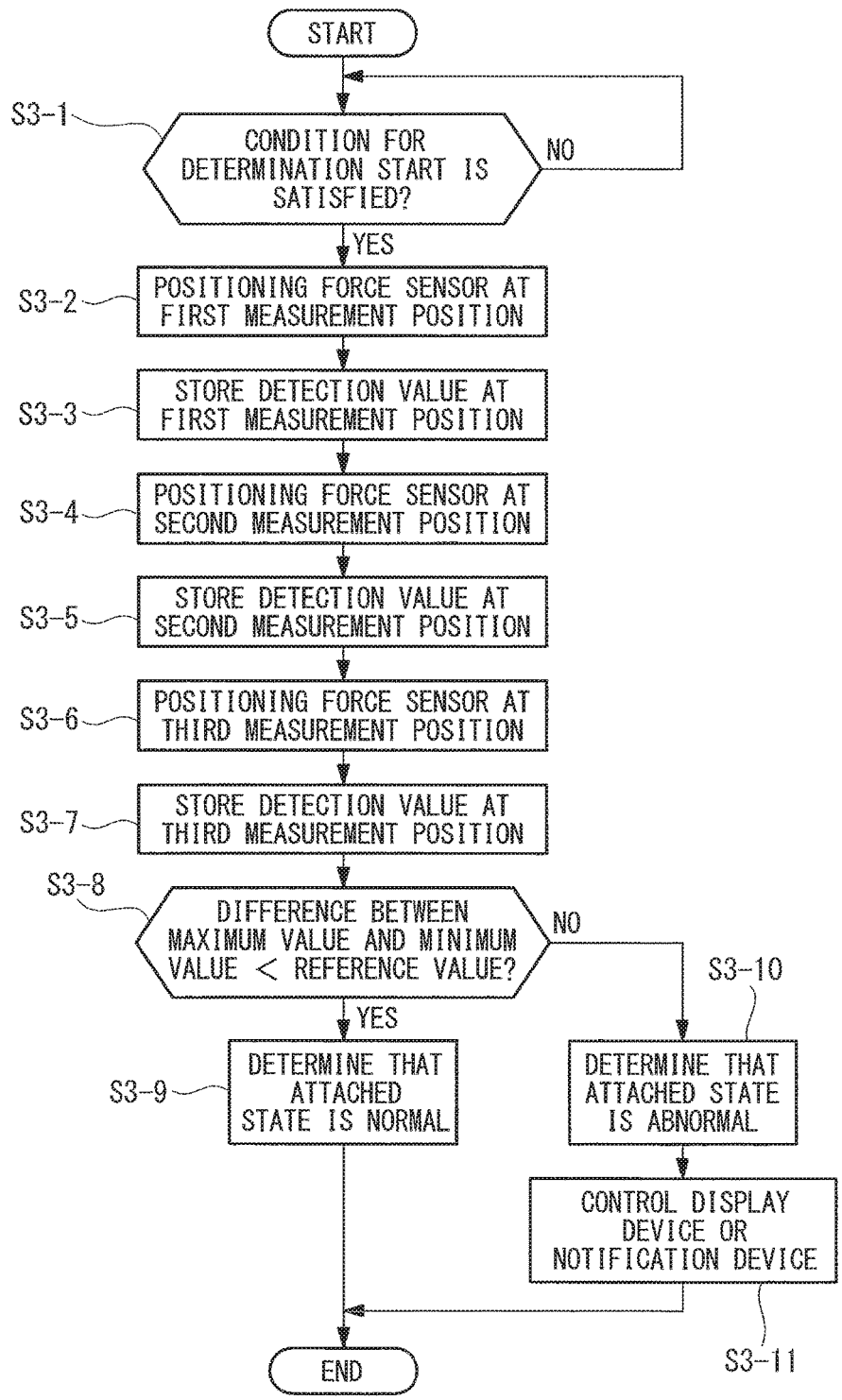
FIG. 6 is a flowchart showing example operation of a control unit of a machining system according to a third embodiment of the present invention.

Operation of the control unit 90 at the time of determination of the attached state of the tool holder 30 according to the present embodiment will be described with reference to the flowchart in FIG. 6.

Figure 7:
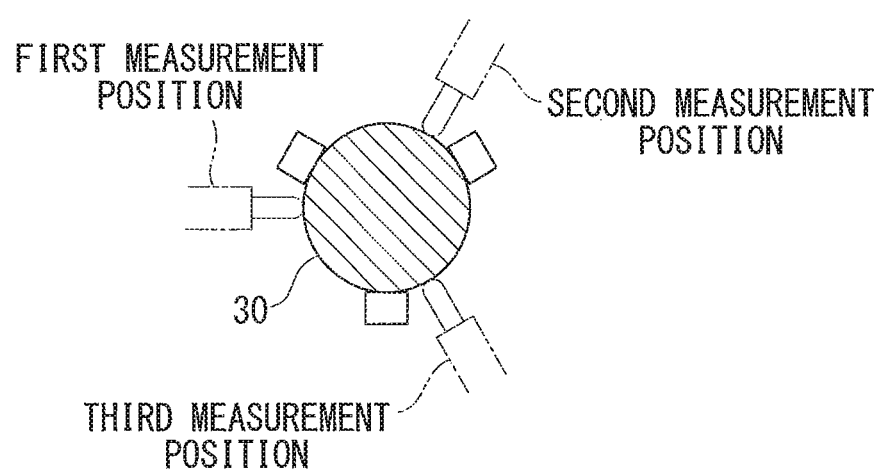
FIG. 7 is an explanatory diagram of operation of the machining system according to the third embodiment.

When a condition for determination start is satisfied (step S3-1) as in the first embodiment, the control unit 90 controls each servo motor 51*a*, 61*a*, 62*a*, 63*a*, 64*a*, 65*a*, 65*b*, 71*a*, 72*a* such that the probe 82 is arranged at a first measurement position in contact with the side surface of the tool holder 30, as shown in FIG. 7, in a state where the rotation servo motor 22 and the vertical movement servo motor 23 of the main spindle 20 are stopped (step S3-2).

In this state, the control unit 90 causes the memory device 91 to store detection values received from the force sensor 81 (step S3-3).

Then, the control unit 90 controls each servo motor 51*a*, 61*a*, 62*a*, 63*a*, 64*a*, 65*a*, 65*b*, 71*a*, 72*a* such that the probe 82 is arranged at a second measurement position in contact with the side surface of the tool holder 30, as shown in FIG. 7 (step S3-4).

In this state, the control unit 90 causes the memory device 91 to store detection values received from the force sensor 81 (step S3-5).

Next, the control unit 90 controls each servo motor 51*a*, 61*a*, 62*a*, 63*a*, 64*a*, 65*a*, 65*b*, 71*a*, 72*a* such that the probe 82 is arranged at a third measurement position in contact with the side surface of the tool holder 30, as shown in FIG. 7 (step S3-6). The servo motors 71*a*, 72*a* are preferably controlled such that the center axis of the probe 82 and the normal line of the side surface of the tool holder 30 substantially coincide with each other at the first to the third measurement positions.

In this state, the control unit 90 causes the memory device 91 to store detection values received from the force sensor 81 (step S3-7).

Next, the control unit 90 determines the attached state of the tool holder 30 based on the detection values for the first to the third measurement positions stored in the memory device 91. Specifically, for example, in the case where the difference between the maximum value and the minimum value of the detection values for each of the first to the third measurement positions is smaller than a predetermined reference value (step S3-8), the attached state is determined to be normal (step S3-9), and in the case where the difference between the maximum value and the minimum value of the detection values for each of the first to the third measurement positions is equal to or greater than the predetermined reference value (step S3-8), the attached state is determined to be abnormal (step S3-10), and the display device 92 or the notification device 93 is controlled to indicate that the attached state is abnormal (step S3-11).

In this manner, in the third embodiment, because the forces with which the probe 82 comes into contact with first, second and third circumferential positions of the tool holder 30 are detected by the force sensor 81 in states where the probe 82 attached to the distal end portion of the robot arm 60 is arranged at predetermined measurement positions, if the side surface of the tool holder 30 is shifted in a direction orthogonal to the center axis of the main spindle 20, the detection values of the force sensor 81 change according to the shift. Accordingly, if the position of the center axis of the tool holder 30 is shifted in the direction orthogonal to the center axis of the main spindle 20, the shift is reflected in the detection values. That is, the attached state of the tool holder 30 may be determined based on the detection values.

Moreover, the attached state of the tool 40 may be determined in the same manner if the probe 82 is made to contact the side surface of the tool 40 in steps S3-2, S3-4, S3-6.

Additionally, in the third embodiment, instead of performing step S3-4, it is also possible to control each servo motor 51a, 61a, 62a, 63a, 64a, 65a, 65b, 71a, 72a such that the force sensor 81 and the probe 82 are arranged at the first measurement position after the main spindle is rotated by the rotation servo motor 22 by a predetermined angle (for example, 120 degrees) and is stopped, and instead of performing step S3-6, it is also possible to control each servo motor 51a, 61a, 62a, 63a, 64a, 65a, 65b, 71a, 72a such that the force sensor 81 and the probe 82 are arranged at the first measurement position after the main spindle 20 is further rotated by the rotation servo motor 22 by a predetermined angle (for example, 120 degrees) and is stopped.

Also in such a case, the probe 82 comes into contact with the first, the second, and the third circumferential positions of the tool holder 30, and the forces are detected by the force sensor 81, and thus, the attached state of the tool holder 30 may be determined as in the case described above.

A machining system according to a fourth embodiment of the present invention will be described below with reference to the drawings.

In contrast to the machining system of the second embodiment, the machining system according to the present embodiment performs detection by the displacement sensor 83 in a state where the main spindle 20 is not rotated. Structures not described below are the same as those in the second embodiment.

Figure 8:
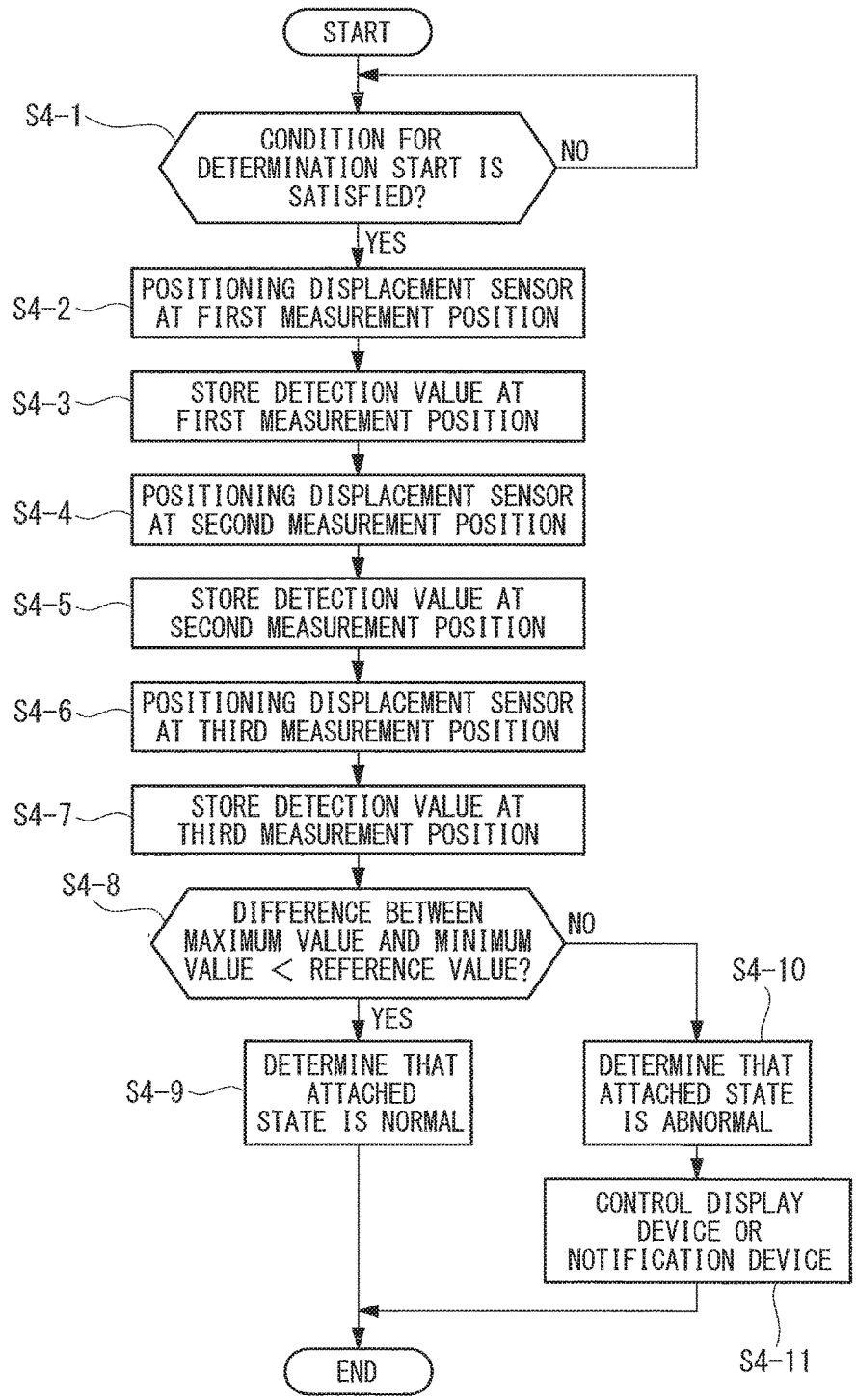
FIG. 8 is a flowchart showing example operation of a control unit of a machining system according to a fourth embodiment of the present invention.

Operation of the control unit 90 at the time of determination of the attached state of the tool holder 30 according to the present embodiment will be described with reference to the flowchart in FIG. 8.

Figure 9:
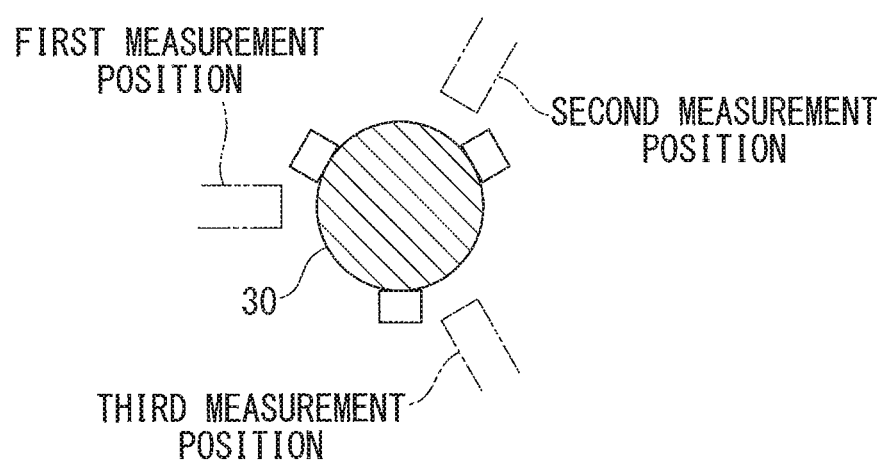
FIG. 9 is an explanatory diagram of operation of the machining system according to the fourth embodiment.

When a condition for determination start is satisfied (step S4-1) as in the first embodiment, the control unit 90 controls each servo motor 51a, 61a, 62a, 63a, 64a, 65a, 65b, 71a, 72a such that the displacement sensor 83 is arranged at a first measurement position near the side surface of the tool holder 30, as shown in FIG. 9, in a state where the rotation servo motor 22 and the vertical movement servo motor 23 of the main spindle 20 are stopped (step S4-2).

In this state, the control unit 90 causes the memory device 91 to store detection values received from the displacement sensor 83 (step S4-3).

Then, the control unit 90 controls each servo motor 51a, 61a, 62a, 63a, 64a, 65a, 65b, 71a, 72a such that the displacement sensor 83 is arranged at a second measurement position near the side surface of the tool holder 30, as shown in FIG. 9 (step S4-4).

In this state, the control unit 90 causes the memory device 91 to store detection values received from the displacement sensor 83 (step S4-5).

Then, the control unit 90 controls each servo motor 51a, 61a, 62a, 63a, 64a, 65a, 65b, 71a, 72a such that the displacement sensor 83 is arranged at a third measurement position near the side surface of the tool holder 30, as shown in FIG. 9 (step S4-6).

In this state, the control unit 90 causes the memory device 91 to store detection values received from the displacement sensor 83 (step S4-7).

Additionally, a case where the displacement sensor 83 is of a non-contact type is described above, but in the case where the displacement sensor 83 is of a contact type, the probe of the displacement sensor 83 is made to contact the side surface of the tool holder 30 at the first to the third measurement positions.

Next, the control unit 90 determines the attached state of the tool holder 30 based on the detection values for the first to the third measurement positions stored in the memory device 91. Specifically, for example, in the case where the difference between the maximum value and the minimum value of the detection values for each of the first to the third measurement positions is smaller than a predetermined reference value (step S4-8), the attached state is determined to be normal (step S4-9), and in the case where the difference between the maximum value and the minimum value of the detection values for each of the first to the third measurement positions is equal to or greater than the predetermined reference value (step S4-8), the attached state is determined to be abnormal (step S4-10), and the display device 92 or the notification device 93 is controlled to indicate that the attached state is abnormal (step S4-11).

In this manner, in the fourth embodiment, because displacement or a position is detected by the displacement sensor 83 attached to the distal end portion of the robot arm 60 for the first, the second, and the third circumferential positions of the side surface of the tool holder 30, if the side surface of the tool holder 30 is shifted in a direction orthogonal to the center axis of the main spindle 20, the detection values of the displacement sensor 83 change according to the shift. Accordingly, if the position of the center axis of the tool holder 30 is shifted in the direction orthogonal to the center axis of the main spindle 20, the shift is reflected in the detection values. That is, the attached state of the tool holder 30 may be determined based on the detection values.

Moreover, the attached state of the tool 40 may be determined in the same manner if the probe 82 is made to come close to the side surface of the tool 40 in steps S4-2, S4-4, and S4-6.

Additionally, in the fourth embodiment, instead of performing step S4-4, it is also possible to control each servo motor 51a, 61a, 62a, 63a, 64a, 65a, 65b, 71a, 72a such that the displacement sensor 83 is arranged at the first measurement position after the main spindle is rotated by the rotation servo motor 22 by a predetermined angle (for example, 120 degrees) and is stopped, and instead of performing step S4-6, it is also possible to control each servo motor 51a, 61a, 62a, 63a, 64a, 65a, 65b, 71a, 72a such that the displacement sensor 83 is arranged at the first measurement position after the main spindle 20 is further rotated by the rotation servo motor 22 by a predetermined angle (for example, 120 degrees) and is stopped.

Also in such a case, the displacement sensor 83 comes close to the first, the second, and the third circumferential positions of the tool holder 30, and the position or displacement of the side surface of the tool holder 30 is detected by the displacement sensor 83, and thus, the attached state of the tool holder 30 may be determined as in the case described above.

In the first to the fourth embodiments, the robot 50 and the robot arm 60 are assumed to be for change of a workpiece, but the robot 50 and the robot arm 60 may be for performing inspection of a machined workpiece. For example, a sensor for inspection, such as a camera, is attached to the distal end portion of the robot arm 60, and the sensor is arranged at a predetermined position by the robot arm 60, and inspection of a machined workpiece is thereby performed.

Moreover, in the first to the fourth embodiments, the memory device 91 may store, in the form of coordinate data or the like, information about predetermined measurement positions in step S1-2, step S2-2, step S3-2, step S3-4, step S3-6, step S4-2, step S4-4, and step 4-6 so that each of a plurality of types of tools 40 may be handled.

The control unit 90 may refer to the information, and may control the robot arm 60 such that the probe 82 or the displacement sensor 83 is arranged at a measurement position according to the type of the tool 40 attached to the main spindle 20 in step S1-2, step S2-2, step S3-2, step S3-4, step S3-6, step S4-2, step S4-4, or step S4-6.

In this case, the probe 82 or the displacement sensor 83 is arranged at an appropriate position according to the type of the tool 40, and thus, there is an advantage when performing determination of an attached state after the tool 40 is replaced.

REFERENCE SIGNS LIST 10 frame
11 workpiece holding section
20 main spindle
30 tool holder
40 tool
50 robot
51 base
60 robot arm
61 base section
62 proximal arm
63 middle section
64 distal arm
65 chuck section
70 sensor support section
71 base section
72 arm
80 force sensor unit
81 force sensor
82 probe

The invention claimed is:

1. A machining system comprising:
a machine tool for machining a workpiece by rotating a tool attached to a main spindle;
a robot including a robot arm for conducting a change of the workpiece for the machine tool or an inspection of the workpiece after machining;
a sensor supporter which is attached to a distal end portion of the robot arm, the sensor supporter comprising:
a base section supported by the distal end portion of the robot arm so that the base section is capable of independent rotation, around a first axis extending in a vertical direction, relative to the distal end portion of the robot arm;
an arm supported by the base section so that the arm is capable of independent rotation, around a second axis extending in a horizontal direction, relative to the base section;
a force sensor unit supported at a distal end portion of the arm in a manner capable of rotating around an axis extending in a horizontal direction, wherein the force sensor unit comprises a contact section that is attached to the sensor supporter via a force sensor;
a base section servo motor for rotating the base section relative to the distal end portion of the robot arm;
an arm servo motor for rotating the arm relative to the base section; and
a control unit, wherein the control unit is configured to conduct:
a measurement process of controlling the robot arm, the base servo motor, and the arm servo motor such that the contact section is positioned at a predetermined measurement position where the contact section comes into contact with a side surface of the tool or a side surface of a tool holder for attaching the tool to the main spindle, and obtaining detection values of the force sensor over a predetermined period of time in a state where the main spindle is rotating; and
a determination process of determining an attached state of the tool or the tool holder based on the detection values obtained over the predetermined period of time.

2. The machining system according to claim 1, further comprising:
a measurement position information storage unit storing information about each predetermined measurement position in association with each of a plurality of types of tools; and
wherein the measurement process includes referring to the information about each predetermined measurement position, and controlling the robot arm such that the contact section and the force sensor is positioned at each predetermined measurement position according to the type of the tool.

* * * * *